Figure 1:
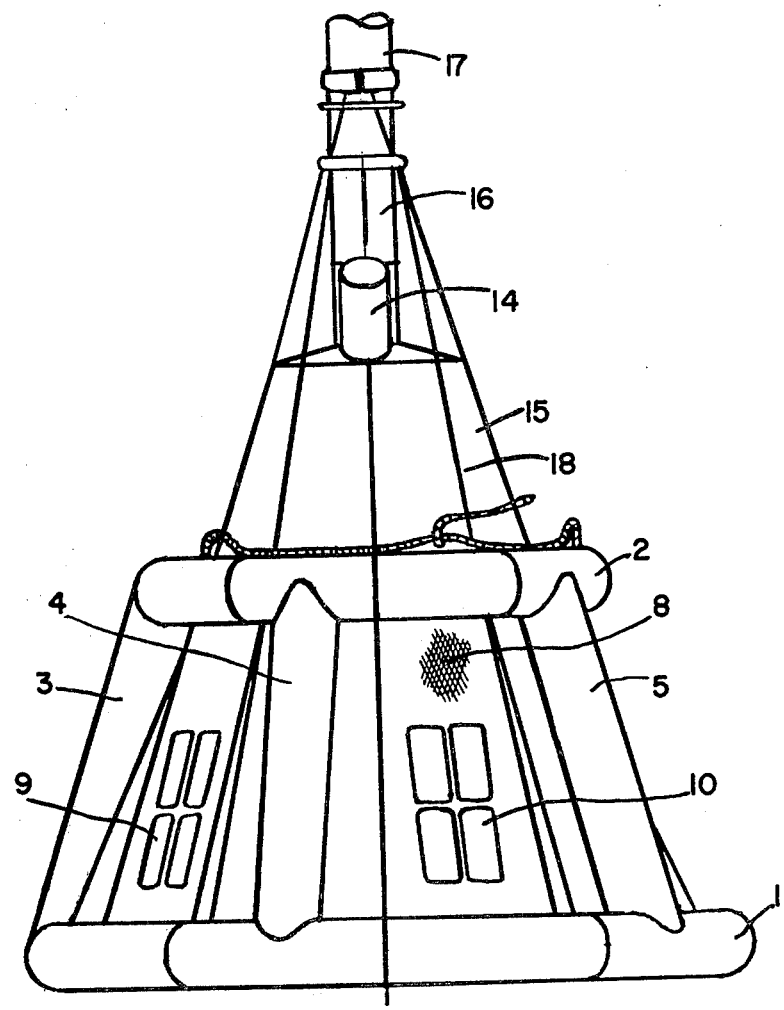

United States Patent [19]

Hanrot et al.

[11] 4,248,277
[45] Feb. 3, 1981

[54] BELL-SHAPED DEVICE FOR APPARATUS FOR CHARGING DUSTY MATERIALS

[75] Inventors: Jean-Pascal Hanrot, Aix en Provence; Jacky Volpeliere, Mimet, both of France

[73] Assignee: Aluminum Pechiney, Lyons, France

[21] Appl. No.: 24,120

[22] Filed: Mar. 26, 1979

[30] Foreign Application Priority Data

Apr. 10, 1978 [FR] France ............................ 78 11000

[51] Int. Cl.³ .............................................. B65B 3/18
[52] U.S. Cl. ................................. 141/93; 406/114; 406/152
[58] Field of Search ................. 53/167; 141/7, 65, 93, 141/114, 285, 290, 374, 392; 406/114, 141, 152

[56] References Cited

U.S. PATENT DOCUMENTS

| | | | |
|---|---|---|---|
| 3,241,581 | 3/1966 | Richardson et al. | 141/93 |
| 3,867,969 | 2/1975 | Garnett | 141/93 X |
| 4,061,221 | 12/1977 | Higashinata et al. | 141/93 X |

Primary Examiner—Frederick R. Schmidt
Attorney, Agent, or Firm—McDougall, Hersh & Scott

[57] ABSTRACT

A charging device for pulverulent or granular materials also containing fine particles which are likely to fly around, which comprises from the bottom to the top:

(a) a light charging chamber in the shape of a truncated pyramid or truncated cone comprising at least two polygonal or toric crowns formed by inflatable tubes situated in different planes, rigidifying cross-members between the tubes, and a flexible skirt integral with the tubes, (b) a flexible connecting hopper connected in a sealed manner to the inflatable charging chamber, (c) a sleeve between the flexible hopper and a material feed nozzle, and (d) finally at least one dust suction nozzle connected to a dust-removing device, the charging device having the characteristics of floating on the heap of material being formed, and preventing dust spirals formed during operation.

7 Claims, 2 Drawing Figures

BELL-SHAPED DEVICE FOR APPARATUS FOR CHARGING DUSTY MATERIALS

The invention relates to a novel bell-shaped apparatus intended to be adapted to an apparatus for charging pulverulent or granular materials containing fine particles, to prevent the fine particles and dust from flying around during the charging operation, to trap and to recycle it.

The production of a heap of pulverulent products on a storage surface, or the filling of a ship's hold by means of a flexible nozzle with its end located above the heap being formed, have invariably caused formation of a dense cloud of dust which is extremely inconvenient for the personnel present, if no device is provided for trapping the fine particles.

In fact, it is well known that any pulverulent material which is delivered through a vertical feed nozzle entrains a volume of air as it falls which is substantially equal to four or five times the volume of the material at rest. This entrainment is caused by a suction effect owing to the acceleration by the weight of the material delivered through the nozzle and by its friction with the air. As the material falls in the pipework, it becomes fluidized by the air with which it is intimately bound.

Thus, the fluidized pulverulent material charges the ambient air with dust, carrying it along at first in the direction in which the product flows from the feed nozzle and spreading over the surface of the heap being formed, then rising in spirals, upon contact with the heap, and being continuously renewed and expelled to form an opaque cloud which can be extremely large.

A known means of protection from the untimely emission of dust involves preventing the jet of fluidized material from making contact with the ambient air until its moment of impact on the heap being formed, and simultaneously sucking a volume of air which is at least equal to the total volume of air and material introduced at any moment.

To this end, a first well-known apparatus consists of a metallic truncated cone having its small base integral with the end of the feed nozzle while the large base is provided with rubber petals of rectangular shape. The corolla thus formed round the jet of material prevents it from making contact with the ambient air and thus reduces the formation of dust spirals. In an interesting improvement for limiting the formation of dust spirals, it has been proposed to provide the corolla of the above apparatus with a nozzle which sucks the dust-charged air.

Although this apparatus imparts certain improvements by limiting the formation of dust spirals, it should be noted that it has disadvantages which obstruct the development thereof.

Firstly, the corolla represents a large mass which causes overloading of the jib of the gantry supporting the feed nozzle and on which it is suspended by a number of cables. This overloading makes it necessary to reinforce the structure of the gantry and, hence, to increase its construction cost.

Secondly, the corolla provided with petals is frequently buried in the heap being formed and considerable mechanical force is required to free the corolla for the apparatus to function well.

Finally, the rigidity of the device formed by the corolla and the nozzle necessitates a continuous vertical movement of the assembly so that the large base of the corolla is held in the vicinity of the heap being formed, and it is well known that the latter disadvantage has virtually never been overcome, for example, when a boat subjected to a swell is being charged.

However, another equally well known apparatus consists of a dust receiver which is suspended on the gantry supporting the feed nozzle, in the vicinity of the heap, into which the material escaping from the heap owing to overflow falls, once the material has been deaerated. This device has the effect of reducing the speed at which the material falls in the open air, and, hence, the formation of dust spirals. This apparatus has drawbacks which restricts its use to pulverulent products and is not suitable for granular products. It is also very heavy and needs a reinforced gantry to support it.

Since effective protection from untimely emission of dust at the moment of charging pulverulent or granular materials has not yet been found and since the problem has only been imperfectly solved over the past several years, applicants have carried out their research in this field and have consequently found and developed a novel bell-shaped device intended to be adapted to an apparatus for charging these materials which provides a true and effective solution to the difficulties encountered by the skilled man and it is an object of this invention to provide an apparatus for achieving same.

The novel device according to the invention, which is intended for charging pulverulent or granular materials also containing fine particles which are likely to fly around, the aim of which is to prevent the particles from flying around while a heap of the material is being formed, by trapping the dust with a view to recycling it, comprises a material feed nozzle, a charging chamber which is axially joined with the feed column by means of an articulated suspension means, as well as a dust collector, is characterized in that, in order to make the said device float on the surface of the heap being formed, it comprises from the bottom to the top;

(a) a light charging chamber in the shape of a truncated pyramid or truncated cone comprising at least two polygonal or toric crowns formed by inflatable tubes, located in different planes, rigidifying cross-members between the tubes and a flexible skirt which is integral with the semi-rigid structure thus produced, (b) a flexible connecting hopper connected in a sealed manner to the inflatable charging chamber, (c) a connecting sleeve between the flexible hopper and the material feed nozzle, and (d) at least one dust suction nozzle connected to a dust removing device or collector.

The pyramid-shaped chamber of inflatable structure forms a semi-rigid bell comprising at least two inflatable tubes located in two different planes spaced at a distance from each other. These tubes are in parallel planes in the majority of cases but can also be situated in concurrent planes, depending upon the particular cases specified.

These inflatable tubes are generally situated in two horizontal planes, but they can also be located in oblique planes.

Similarly, and in a general manner, the inflatable tubes are coaxial when they are in paralell planes, but their axes can be different for more special applications.

The tubes constitute crowns of toric circular shape, or of polygonal shape, the perimeters of which are generally different, but can be identical in a number of applications.

In order that the light and inflatable pyramid-shaped chamber might have a certain vertical rigidity, the above-mentioned tubes are connected to each other by means of rigidifying cross-members which can themselves be inflatable tubes, or they can be produced from metallic materials such as aluminum, steel, reinforced or unreinforced polymeric materials such as polyamide, polyethylene, polypropylene, polyester, etc., or of natural materials such as wood.

Thus, the tubes which are connected to each other by such cross-members constitutes a semi-rigid and light structure closed by a flexible skirt which can be made of textile material and which traps the spirals of dust.

In order to facilitate evacuation of the dust spirals formed in the charging chamber, it is desirable to provide openings on the periphery of the skirt for transmission of external air which then carry the dust along in the suction nozzle connected to the dust-removing device.

The flexible connecting hopper is generally in the shape of a truncated cone or truncated pyramid, depending upon the shape of the charging chamber itself. This hopper plays a fundamental part in the device of this invention because it allows the inflatable charging chamber to float on the heap being formed thus absorbing all the relative vertical and angular displacements between the charging nozzle and the inflatable charging chamber.

The sleeve, which forms the connecting member between the flexible hopper and the charging nozzle, can be produced from a rigid or flexible material. It can also be provided with various fittings, such as a suction nozzle which is lateral or again coaxial to the feed nozzle, sampling openings, one or more level detectors, etc.

Consequently, the design of the device according to the invention affords qualities which have undeniably been sought for a long time, which impart to it characteristics which are exceptional and unique by comparison with devices of the prior art.

The device of this invention is very light and this allows it to be easily maintained, whether inflated or not, and imposes only a slight burden on the support element which can consequently have a very lightened structure and, as already expressed, really floats on the heap being formed without becoming buried in the material.

Furthermore, since the device of this invention is inflatable, its flexibility can be controlled in accordance with a suitable selection so that its base fits the shape of the heap. However, this also allows it, when deflated, to be dismantled and stored easily, to be affected by the wind only to a slight extent, but particularly, to be introduced into capacities which are to be filled but which have an opening of very small cross-section.

Figure 2:
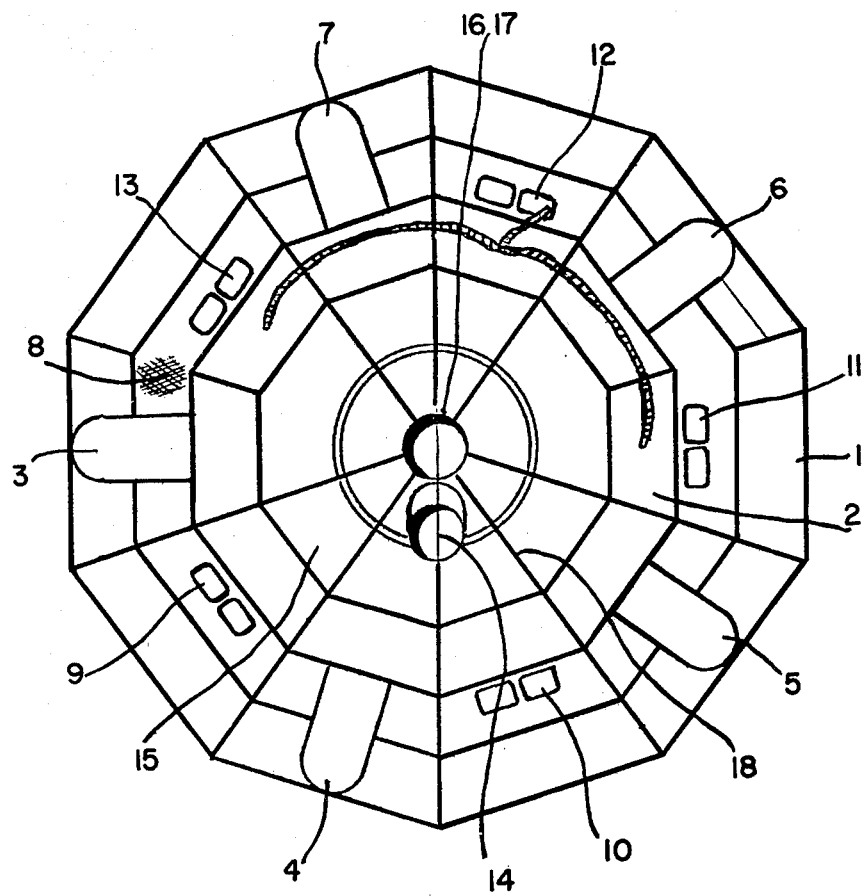

For purposes of illustration, but not of limitation, an embodiment of the invention is shown in the accompanying drawings, in which:

FIG. 1 is a front elevational view of the device embodying the features of this invention, and FIG. 2 is a top plan view of the device shown in FIG. 1.

According to FIGS. 1 and 2, the charging chamber is in the form of a truncated pyramid and is composed of inflatable coaxial tubes 1 and 2 situated in two spaced horizontal parallel planes. The said tubes are connected to each other by means of vertically disposed rigidifying cross-members 3, 4, 5, 6 and 7 which are themselves inflated. A rigid and light structure is thus obtained, owing to the combination of tubes 1 and 2 with the above-mentioned cross-members.

This light weight and rigid structure is enclosed by a textile skirt 8 trapping the spirals of dust.

Openings 9, 10, 11, 12 and 13 are provided in the portions of the skirt between the tubes 1 and 2 for inflow of external air which carries the dust into the suction nozzle 14 connected to a conventional dust-removing device or dust collector (not shown).

A flexible hopper 15, having the truncated shape of the charging chamber, communicates at its lower base of larger dimension with the upper end of the chamber while a sleeve 16 connects the upper end of small cross section with the material feed nozzle 17. The flexible hopper, which is produced of textile material, plays a very important part in the device of this invention since it absorbs all the movements (of swell, for example), while at the same time allowing the inflatable chamber to float on the surface of the heap being formed.

The sleeve 16 is provided with the suction nozzle 14 used for the removal of the spirals of dust formed in the inflatable chamber.

Finally, the device comprises a number of suspension cables, such as 18, which provides the hopper 15 with all its flexibility and which allows the structure to be maneuvered before or after use without the risk of damaging the hopper and the skirt by excessive stresses.

It will be understood that changes may be made in the details of construction, arrangement and operation, without departing from the spirit of the invention, especially as defined in the following claims.

We claim:

1. A device for charging pulverulent or granular materials also containing fine particles which are likely to fly around, during the formation of a heap of such materials, to trap and to recycle the flying particles comprising a pulverulent or granular material feed column, a rigid charging chamber, an articlated suspension, axially connecting the feed column with the charging chamber, a suction column for the said fine particles, including from the bottom to the top:
   (a) a light charging chamber in the shape of a truncated pyramid or truncated cone having at least two polygonal or toric crowns of inflatable tubes arranged in spaced planes, rigidifying cross-members connecting the tubes and a flexible skirt enclosing the space between the tubes, an inlet opening in the skirt for the passage of air,
   (b) a flexible hopper connected to the light charging chamber,
   (b₁) a material feed nozzle in communication with the flexible hopper,
   (c) a connecting sleeve between the flexible hopper and the material feed nozzle,
   (d) at least one dust suction nozzle having its inlet in the vicinity of the sleeve for communicating the device with a dust-removing device, and
   (e) means for movement of the device.

2. A charging device as claimed in claim 1, in which the crowns are in parallel planes.

3. A charging device as claimed in claim 2, in which the crowns are in horizontal planes.

4. A charging device as claimed in claim 2, in which the axes of the crowns are coaxial.

5. A charging device as claimed in claim 1, in which the rigidifying cross-members are inflatable tubes.

6. A charging device as claimed in claim 1, in which the rigidifying cross-members are formed of materials selected from the group consisting of a metal, polymeric materials which may be reinforced, natural or synthetic materials.

7. A charging device as claimed in claim 1, which includes suspension cables connected to the device to allow it to be manipulated before or after use without producing stresses on the skirt and the hopper.

* * * * *